US007930551B2

(12) United States Patent
Evans

(10) Patent No.: US 7,930,551 B2
(45) Date of Patent: Apr. 19, 2011

(54) METHOD AND SYSTEM FOR REUSING AN MMH FUNCTION TO PERFORM A FAST MMH-MAC CALCULATION

(75) Inventor: David Reginald Evans, Boulder, CO (US)

(73) Assignee: ARRIS Group, Inc., Suwanee, GA (US)

( * ) Notice: Subject to any disclaimer, the term of this patent is extended or adjusted under 35 U.S.C. 154(b) by 1008 days.

(21) Appl. No.: 11/748,953

(22) Filed: May 15, 2007

(65) Prior Publication Data

US 2007/0291933 A1 Dec. 20, 2007

Related U.S. Application Data

(60) Provisional application No. 60/800,578, filed on May 15, 2006.

(51) Int. Cl.
*H04L 9/32* (2006.01)
(52) U.S. Cl. ............................ 713/181; 713/168; 380/28
(58) Field of Classification Search .................. 713/181, 713/168; 380/28
See application file for complete search history.

(56) References Cited

U.S. PATENT DOCUMENTS

| 2002/0110239 A1* | 8/2002 | Venkatesan et al. | ............ 380/28 |
| 2004/0131180 A1* | 7/2004 | Mazuz et al. | .................. 380/37 |
| 2004/0252836 A1* | 12/2004 | Yoshida et al. | ............... 380/268 |
| 2008/0112561 A1* | 5/2008 | Kim et al. | ....................... 380/42 |

FOREIGN PATENT DOCUMENTS

EP    1133099 A2 * 12/2001

OTHER PUBLICATIONS

Black et al., "UMAC: Fast and Secure Message Authentication", Aug. 4, 1999, Advances in Cryptology, CRYPTO '99, pp. 1-27.*
Halevi et al., "MMH: Software Message Authentication in the Gbit/second Rates", Mar. 1997, Proceedings of the 4th Workshop on Fast Software Encryption, LNCS vol. 1267, Springer, 1997. pp. 172-189.*
Atici et al., "Universal Hashing and Multiple Authentication", 1996, Advances in Cryptology—CRYPTO '96, pp. 16-30.*
DOCSIS 3.0 Security Specification CM-SP-SECv3.0-I03-070223. Feb. 23, 2007. Section 11, pp. 87-94. Cable Television Laboratories, Inc.

* cited by examiner

*Primary Examiner* — Kambiz Zand
*Assistant Examiner* — Tongoc Tran
(74) *Attorney, Agent, or Firm* — Troy A. Van Aacken

(57) ABSTRACT

A transmitting and receiving device share a secret which is split into first and second portions. A public function is used to generate a keystream. The length of the keystream is adjusted to equal the length of a message plus the length of the output of an MMH function. The MMH function is calculated as a function of the message and the adjusted keystream. Each L octets, L is the octet length of a MAC, of the output of the MMH function is accumulated into a summation value, which is concatenated with the second secret portion into a concatenation value. The output of the public function, now calculated as a function of the concatenation value, is used in place of a traditional one-time pad to generate the MAC which is sent along with the message to the receiving device.

6 Claims, 1 Drawing Sheet

METHOD AND SYSTEM FOR REUSING AN MMH FUNCTION TO PERFORM A FAST MMH-MAC CALCULATION

CROSS REFERENCE TO RELATED APPLICATION

This application claims the benefit of priority under 35 U.S.C. 119(e) to Evans, et al., U.S. Provisional Patent Application No. 60/800,578 entitled "Fast MMH-MAC calculation by re-use of MMH function," which was filed May 15, 2006, and is incorporated herein by reference in its entirety.

FIELD OF THE INVENTION

This invention relates, generally, to communication networks and, more particularly, to performing message transmission security in a communication network.

BACKGROUND

One method of securing a message transmitted between two devices is to use a one time pad. Both devices have a copy of the one time pad value and use it to calculate the output of a function, typically a hash function, based on message and the one time pad value. The results of the hash function may be referred to as a Message Authentication Codes ("MAC"). When the receiving device receives the message along with the MAC calculated at the transmitting device, it calculates the same hash function for the received message and its stored copy of the one time pad. If the hash function output calculated at the receiving device is the same as the MAC received from the transmitting device, then the receiving device determines that the message was not altered after it was transmitted from the transmitting device.

While using a one-time pad results in secure transmission of the message, the one-time pad is not reused. Thus, new one-time pad values must be generated and distributed to the transmitting device and the receiving device. This can consume processor resources as well as band width resources between transmitting devices and receiving devices. Thus, there is a need in the art for a method for determining a MAC that does not rely on a one-time pad value.

DETAILED DESCRIPTION

Figure 1:
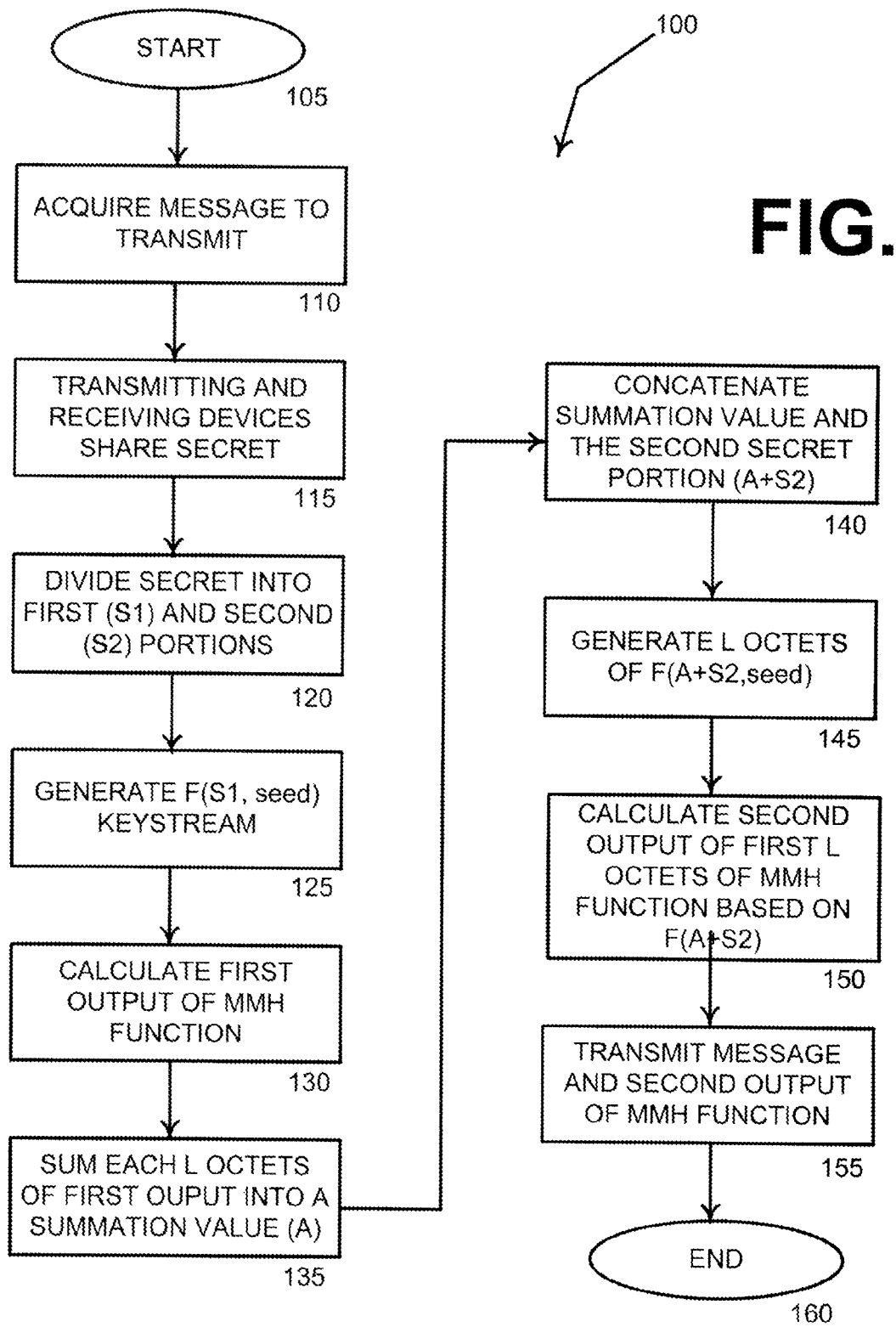
FIG. 1 illustrates a flow diagram of a method for generating Message Authentication Codes from a Multilinear Hash Function and a shared secret.

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude any such other embodiments, adaptations variations, modifications and equivalent arrangements, the present invention being limited only by the claims appended hereto and the equivalents thereof.

Turning now to the figure, FIG. 1 illustrates a flow diagram of a method 100 for generating Message Authentication Codes ("MAC") from a Multilinear Hash Function and a shared secret. After starting at step 105, a transmitting device acquires a message to be transmitted to a receiving device at step 110. At step 115, the transmitting and receiving devices share a secret.

It will be appreciated that although the sharing of the secret is represented by a step having a higher reference number than the reference number for the receiving of the message to be transmitted, the sharing of the secret can occur at anytime in reference to the receiving of the message to be transmitted. In some scenarios, for example, the use of a cable modem ("CM") and a cable modem termination system ("CMTS") as know in the art of Data Over Cable Service Interface Specifications ("DOCSIS"), the secret may be shared at the time the devices are manufactured, or at the time a given cable CM or a given CMTS module is placed into service in a hybrid fiber coaxial cable system, for example. In addition, it will be appreciated that in some scenarios, the sharing of the secret may occur periodically, which period may vary according to system design, including monthly, weekly, daily, hourly, or even more or less frequently.

At step 120, the secret ("S") is divided into a first secret portion ("S1") and a second secret portion ("S2"). As discussed above, the splitting of S into S1 and S2 can occur at any time. Furthermore, each transmitting and receiving device can perform the splitting operation based on the same splitting algorithm, or one or the other of the receiving or transmitting devices can perform the splitting function and then transmit S1 and S2 to the other device.

At step 125, the output of a public function F(x) is computed for S1. It will be appreciated that the public function if preferably the function F( ) described in section 11.8 of DOCSIS 3.0 Security Specification CM-SP-SECv3.0-I03-070223, as published by CableLabs, Inc., which document is referred to herein as the "Security Specification" and is incorporated herein by reference in its entirety. It will be appreciated that other functions may be used as desired in other implementations of method 100, and that the description of the function F below is given as an example of a public function that can be used in method 100.

From the Security Specification:

Key derivation sections in this document refer to a function F(S, seed), where S is a shared secret from which keying material is derived, and seed is a constant string. The output of F( ) is a pseudo-random sequence suitable for use as a key. The output of F(S, seed) is generated as follows:

1. From S, generate a derived shared secret, S', by accumulation as follows: the value S' is obtained by XORing every 16 octets of S, padding with zeroes as necessary (i.e., add zeroes to the end of S to pad it out to a length that is an integral multiple of 16 octets).
2. Use S' as the initial key to the AES-128 (i.e., 128-bit key, 128-bit block) algorithm operating in counter (CTR) mode.
3. For each block of output needed, set the IV equal to the value of the seed, truncated to 128 bits or zero-extended to 128 bits as necessary, and XORed with the number of the block, starting with 1 (one) and incrementing by 1 (one) for each block processed. The output of F(S, seed)

is the concatenation of the blocks of output obtained in step 3. Any unused octets at the end of the last repetition of step 3 are discarded.

Thus, the output of F(S1) is based on the shared secret and the seed, as described in the Security Specification. In an example, S=S1 for the generation of the output of F(x) at step 125. The output of F(x) is computed at step 125 for a predetermined number, or length, of information units. Preferably, the information units are octets; an octet is known in the art to be eight bits. Furthermore, for example, according to the Security Specification, sixteen octets comprise the desired output block length for a MAC. Other values may be used for the output block length, according to the needs of the user of the system. For purposes of discussion, the desired number of octets in a MAC is represented by L herein. At step 125, the calculation of F(S1, seed) generates a keystream output of octets. The number of octets in the keystream is determined to that the length of the keystream is sufficient for the one-way function to operate on the message M that is to be protected. The message M to be protected may be padded with null bits so that its size is a multiple of the word size used by the one-way function. For example, the Security Specification states that word size is two octets, or sixteen bits. If the keystream generated step 125 is greater than necessary for the one-way function to operate on M, whether null padding is used or not, then the keystream is truncated to the necessary length.

At step 130, a first output of a one-way function is calculated. An example of a one-way function that may be performed at step 130 is a hash function. An example of such a hash function is a Multilinear Modular Hash ("MMH") function, as described in the Security Specification. At step 135, each L octets of the first output of the one-way function are summed into summation value ("A"). The summation value A and the second secret portion S2 are concatenated at step 140 into a concatenated value.

At step 145, the first L octets of F(x) are calculated based on the concatenated value. Thus, for example, the first L octets of the output of F(A+S2, seed) are generated at step 145. At step 150 a second output of the one-way function is calculated based on F(A+S2, seed) calculated in step 145. The result of the calculation of the one-way function at step 150 is used as the MAC. Thus, calculation of the MMH function at step 150 uses the output of F(A+S2, seed) determined at step 145 and is used as a substitute for a one-time pad. However, the calculation of the MMH function to generate a MAC using the public function F(x) results in faster generation of the MAC because a one-time pad does not have to be determined and distributed to the transmitting and receiving device before secure transmission of a message takes place. Only the secret is shared, and the same secret can, and typically is, used over and over again for a period of time.

After the MAC has been generated at step 150, M is transmitted to the receiving device, along with the MAC at step 155. When the receiving device receives the message M and the MAC it performs the same steps 125 through 150 with respect to the message. If the MAC that the receiving device calculates is the same as the MAC received along with the message from the transmitting device, then the receiving device determines that M has not been altered from the time it was transmitted from the transmitting device. If the MAC messages do not match, the receiving device may request that the transmitting device re-transmit the message or perform other actions based on knowledge that the received message does not match the transmitted message. Method 100 ends at step 160.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. A method, comprising:
   acquiring a message to be transmitted to a receiving device;
   sharing a secret between the transmitting device and the receiving device;
   dividing the secret into a first secret portion and a second secret portion;
   generating a first public function output of a public function, the first output of the public function including a stream of a predetermined length of pseudo random information units, wherein the first public function output of the public function is based on the first secret portion;
   calculating a first output of a one-way function based on the message and the first public function output;
   summing the first output of the one-way function for each of a predetermined number of information units into a summation value;
   concatenating of summation value and the second secret portion into a concatenated value;
   generating a second public function output for each of a group of the predetermined number of information units, wherein the second public function output is based on the concatenated value;
   calculating a second output of the one-way function based on the second public function output; and
   transmitting the second output of the one-way function and the message to the receiving device.

2. The method of claim 1 wherein the one-way function is a hash function.

3. The method of claim 1 wherein an information unit is an octet.

4. The method of claim 1 wherein the one-way function is a Multilinear Modular Hash function.

5. The method of claim 1 wherein the predetermined number of information units is the desired length of the output of the one-way function.

6. The method of claim 1 wherein the predetermined length of the pseudo random information units is the same as the length of the message to be transmitted.

* * * * *